United States Patent
Cheng et al.

(10) Patent No.: US 8,874,758 B2
(45) Date of Patent: Oct. 28, 2014

(54) INTERWORKING FUNCTIONAL ENTITY AND PROTOCOL MAPPING METHOD THEREOF

(75) Inventors: Chaowen Cheng, Shenzhen (CN); Mo Sun, Shenzhen (CN); Jun Song, Shenzhen (CN)

(73) Assignee: ZTE Corporation, Shenzhen, Guangdong Province, P.R. (CN)

( * ) Notice: Subject to any disclaimer, the term of this patent is extended or adjusted under 35 U.S.C. 154(b) by 537 days.

(21) Appl. No.: 13/223,361

(22) Filed: Sep. 1, 2011

(65) Prior Publication Data

US 2011/0314172 A1     Dec. 22, 2011

Related U.S. Application Data (63) Continuation of application No. PCT/CN2010/070417, filed on Jan. 29, 2010.

(30) Foreign Application Priority Data

Sep. 25, 2009 (CN) .......................... 2009 1 0178755

(51) Int. Cl.
    *G06F 15/16*     (2006.01)
    *H04L 12/66*     (2006.01)
    *H04L 29/06*     (2006.01)

(52) U.S. Cl.
    CPC .............. *H04L 12/66* (2013.01); *H04L 65/80* (2013.01); *H04L 65/1016* (2013.01); *H04L 65/4076* (2013.01); *H04L 69/08* (2013.01)
    USPC ........................................................ 709/227

(58) Field of Classification Search
    USPC ........................................................ 709/227
    See application file for complete search history.

(56) References Cited

U.S. PATENT DOCUMENTS

| 7,715,391 | B1 * | 5/2010 | Wadhwa et al. | ............... 370/390 |
| 8,451,737 | B2 * | 5/2013 | Yang | ............... 370/241 |

(Continued)

FOREIGN PATENT DOCUMENTS

| CN | 101291541 A | 10/2008 | ............... H04A 7/38 |
| CN | 101459666 A | 6/2009 | ............... H04L 29/06 |
| JP | 2012-530104 | 10/2008 | |
| KR | 10-2009-0051608 | 5/2009 | ............... H04B 7/26 |

OTHER PUBLICATIONS

Savola, P. et al., RFC 3956: Embedding the Rendezvous Point (RP) Address in an IPv6 Multicast Address, Nov. 2004, the Internet Society, pp. 1-18.*

(Continued)

*Primary Examiner* — Alicia Baturay (57) ABSTRACT

The present invention provides an interworking functional entity and a protocol mapping method of the interworking functional entity. The interworking functional entity includes: a first receiving module, configured to receive an Rp reference point protocol message from a top-tier transport resource control functional entity; a first protocol converting module, configured to convert the Rp reference point protocol message into an access node control protocol (ANCP) message; and a first sending module, configured to send the ANCP message obtained by conversion to a co-located transport resource control functional entity arranged in an access node. The technical solution provided by the present invention can solve the problem of interaction among a plurality of transport control functional entities under the case that the plurality of transport control functional entities are cooperatively responsible for the user resource management.

16 Claims, 4 Drawing Sheets

(56) References Cited

U.S. PATENT DOCUMENTS

| | | | |
|---|---|---|---|
| 2005/0101245 A1 | 5/2005 | Ahmavaara | 455/1 |
| 2008/0080519 A1* | 4/2008 | Park et al. | 370/395.54 |
| 2009/0055241 A1* | 2/2009 | Chen et al. | 705/10 |
| 2009/0154478 A1* | 6/2009 | Sridhar et al. | 370/401 |
| 2010/0226379 A1* | 9/2010 | Sun et al. | 370/400 |

OTHER PUBLICATIONS

Samatani, Osamu, et al., "Standardization Activities for Resource and Admission Control Functions in Next Generation Networks", NTT Technical Review, vol. 6, No. 12, Dec. 2008, pp. 1-6.

Youngwook Cha, et al., "Study of High-Speed NGN Resource Control Schemes", pp. 383-392, 2009.

Chaowen Cheng et al., "Proposal to add IWK definition in Q.ANCP;C 128", ITU-T Draft, Study Period 2009-2012, International Telecommunication Union, Geneva, CH, vol. 5/11, Aug. 25, 2009, pp. 1-2, [retrieved on Aug. 25, 2009].

Cathy Zhou, "Updated text for draft new Recommendation Q.ANCP;317 (GEN/11)", ITU-T Draft, Study Period 2009-2012, International Telecommunication Union, Geneva, CH, vol. 5/11, Sep. 21, 2009, pp. 1-15, XP017437269, [retrieved on Sep. 21, 2009].

Cathy Zhou et al., "Protocol specification in Q.ANCP;C 95", ITU-T Draft, Study Period 2009-2012, International Telecommunication Union, Geneva, CH, vol. 5/11, Aug. 21, 2009, pp. 1-8, XP017437802, [retrieved on Aug. 21, 2009].

Cathy Zhou et al., "Muticast admission control procedures in Q.ANCP;C 93", ITU-T Draft, Study Period 2009-2012, International Telecommunication Union, Geneva, CH, vol. 5/11, Aug. 21, 2009, pp. 1-3, XP017437800, [retrieved on Aug. 21, 2009].

http://www.tta.or.ip/, vol. 20, No. 10, 2008, 2 pages.

* cited by examiner

INTERWORKING FUNCTIONAL ENTITY AND PROTOCOL MAPPING METHOD THEREOF

This is a continuation of International Application PCT/CN2010/070417, with an International Filing Date of Jan. 29, 2010, which claims priority to Chinese Application No. 200910178755.X, filed Sep. 25, 2009, each of which is incorporated by reference.

FIELD OF THE INVENTION

The present invention relates to the field of mobile communication technology, in particular to an interworking functional entity (IWK entity, or IWK for short) and a protocol mapping method thereof.

BACKGROUND OF THE INVENTION

Resource and admission control is a brand new concept introduced into the NGN (Next Generation Network), and the function layer thereof is between the service control layer and the bearer transport layer. By implementation of resource and admission control, the specific details of a transport network are upwardly shielded from the service layer, so as to realize the separation of the transmission function from service control; and the resource utilization condition of the transport network is downwards perceived. Through admission control and resource control, proper and reasonable use of transport network resources is ensured, thus the Quality of Service (QoS) is guaranteed, and bandwidth and service stealing is prevented.

Figure 1:
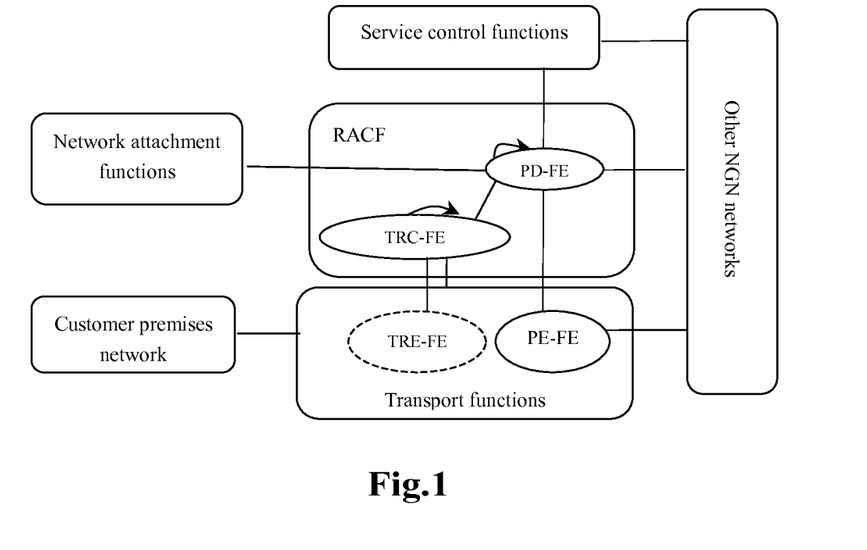
FIG. 1 is a structural architecture diagram of the resource and admission control function according to the prior art.

The ITU organization studies and defines RACF (Resource and Admission Control Functions). The specific architecture of the RACF is as shown in FIG. 1.

A policy decision functional entity (PD-FE) makes a final decision of network resource and admission control according to the network policy rules, service information provided by the service control layer, transport layer subscription information provided by the network attachment function, and the result of resource and admission decisions provided by the transport control function.

A transport resource control functional entity (TRC-FE) is independent of specific services, but depends on transmission techniques. The TRC-FE is responsible for collection and maintenance of the topology and resource state information of the transport network, controls the utilization of the resource and carries out admission control on the transport network according to the topology, connectivity, availability of the network and node resource, and transport layer subscription information in an access network.

The transport layer is composed of a policy enforcement functional entity (PE-FE) and a transport resource enforcement functional entity (TRE-FE). The PE-FE is a packet-to-packet gateway, and can be located between a user end equipment and an access network, between an access network and a core network, or between networks of different operators. The PE-FE is a key node for supporting dynamic QoS control and port address conversion control. The TRE-FE executes transport resource policy rules instructed by the TRC-FE.

CPN is customer premises network, and SCF is service control functions, such as multimedia system IMS and so on. NACF Network Attachment Control Functions) are responsible for providing information such as user subscription data and so on.

In the transport network, there may exist a case that several transport control functional entities are cooperatively responsible for user resource and admission control. For example, the transport resource control functional entity (TRC-FE) co-located in an access node and a transmission entity realizes the admission control of a multicast service through interaction with an upper layer TRC-FE via an Rp interface, such that the multicast replication function can be pushed downwards to the access point, and therefore, plenty of network resources can be saved. In this case, ITU defines an Rp reference point protocol (RCIP), and interaction is realized by commencing the protocol between two TRC-FEs. However, in a specific broadband network deployment, the access node is generally controlled by an IP edge node, i.e. an IP edge node connecting/controlling each access node through the ANCP (Access Node Control Protocol). In the above mentioned case, if the RCIP protocol is to be redeployed at the access node, great expansion of the existing network is required, and it is also a great challenge to the performance of the access node.

SUMMARY OF THE INVENTION

In view of the above, the present invention provides an interworking functional entity and a protocol mapping method of the interworking functional entity, so as to solve the problem of interaction among a plurality of transport control functional entities under the case that the plurality of transport control functional entities are cooperatively responsible for user resource management.

According to one aspect of the present invention, an interworking functional entity is provided, and the interworking functional entity comprises: a first receiving module, configured to receive a first Rp reference point protocol message from a top-tier transport resource control functional entity; a first protocol converting module, configured to convert the first Rp reference point protocol message into a first access node control protocol (ANCP) message; and a first sending module, configured to send the first ANCP message obtained by conversion to a co-located transport resource control functional entity arranged in an access node.

In the above, the first protocol converting module converts the first Rp reference point protocol message into the first ANCP message according to a preset protocol mapping rule.

In the above, the interworking functional entity further comprises: a second receiving module, configured to receive a second ANCP message from the co-located transport resource control functional entity; a second protocol converting module, configured to convert the second ANCP message into a second Rp reference point protocol message; and a second sending module, configured to send the second Rp reference point protocol message obtained by conversion to the top-tier transport resource control functional entity.

In the above, the second protocol converting module converts the second ANCP message into the second Rp reference point protocol message according to a preset protocol mapping rule.

In the above, the interworking functional entity is arranged within an IP edge node, and is located between the top-tier transport resource control functional entity and the co-located transport resource control functional entity; the interworking functional entity is connected to the top-tier transport resource control functional entity through an Rp reference point, and is connected to the co-located transport resource control functional entity through an ANCP protocol; the interworking functional entity is a termination point of the Rp reference point protocol with respect to the top-tier transport resource control functional entity; and the interworking functional entity is also configured to act as an agent between the IP edge node and the access node to surrogate the first Rp reference point protocol message and/or the second Rp reference point protocol message.

According to another aspect of the present invention, a protocol mapping method of an interworking functional entity is provided, comprising: an interworking functional entity converting a first Rp reference point protocol message received from a top-tier transport resource control functional entity into a first ANCP message, and sending the first ANCP message obtained by conversion to a co-located transport resource control functional entity arranged within an access node; and/or the interworking functional entity converting a second ANCP message received from the co-located transport resource control functional entity into a second Rp reference point protocol message, and sending the second Rp reference point protocol message obtained by conversion to the top-tier transport resource control functional entity.

In the above, the first Rp reference point protocol message carries an identification of the first Rp reference point protocol message, and the first ANCP message carries an identification of the first ANCP message; and/or the second Rp reference point protocol message carries an identification of the second Rp reference point protocol message, and the second ANCP message carries an identification of the second ANCP message.

In the above, the method further comprises: presetting a protocol mapping rule, wherein the protocol mapping rule comprises: a mapping relation between an/the identification of the first Rp reference point protocol message and an/the identification of the first ANCP message; and/or a mapping relation between an/the identification of the second Rp reference point protocol message and an/the identification of the second ANCP message.

In the above, the manner of the interworking functional entity converting the first Rp reference point protocol message into the first ANCP message comprises: the interworking functional entity mapping a field in the first Rp reference point protocol message to a corresponding field in the first ANCP message according to the preset protocol mapping rule; and the interworking functional entity mapping the identification of the first Rp reference point protocol message according to the mapping relation in the preset protocol mapping rule to obtain the identification of the first ANCP message.

In the above, the manner of the interworking functional entity converting the second ANCP message into the second Rp reference point protocol message comprises: the interworking functional entity mapping a field in the second ANCP message to a corresponding field in the second Rp reference point protocol message according to the preset protocol mapping rule; and the interworking functional entity mapping the identification of the second ANCP message according to the preset protocol mapping rule to obtain the identification of the second Rp reference point protocol message.

In virtue of the present invention, as an interworking functional entity is configured to carry out mutual conversion between the Rp reference point protocol message and the access node control protocol (ANCP) message, the interaction is realized between the top-tier transport resource control functional entity and the co-located transport resource control functional entity arranged in the access node, which avoids redeployment of the Rp reference point protocol in the access node, reduces the expansion of the existing network, and ensures the performance of the access node.

Other features and advantages of the present invention will be explained in the following specification, and will partly become apparent from the description or are understood by carrying out the present invention. The purpose and other advantages of the present invention can be achieved and obtained by the structure particularly pointed out in the Specification, the Claims and the accompanying drawings.

BRIEF DESCRIPTION OF THE
ACCOMPANYING DRAWINGS

The drawings herein are used to provide further understanding of the present invention and form a part of the specification, and they are used to explain the present invention together with the embodiments of the present invention rather than unduly limit the present invention. In the accompanying drawings.

DETAILED DESCRIPTION OF THE PREFERRED
EMBODIMENTS

The preferred embodiments of the present invention are described hereinafter in conjunction with the accompanying drawings. It shall be understood that the preferred embodiments of the present invention described herein are only used to illustrate and explain the present invention and shall not be construed as limitations on the same. The embodiments of the present application and the features of the embodiments can be combined with each other under the condition that there is no conflict.

Figure 2:
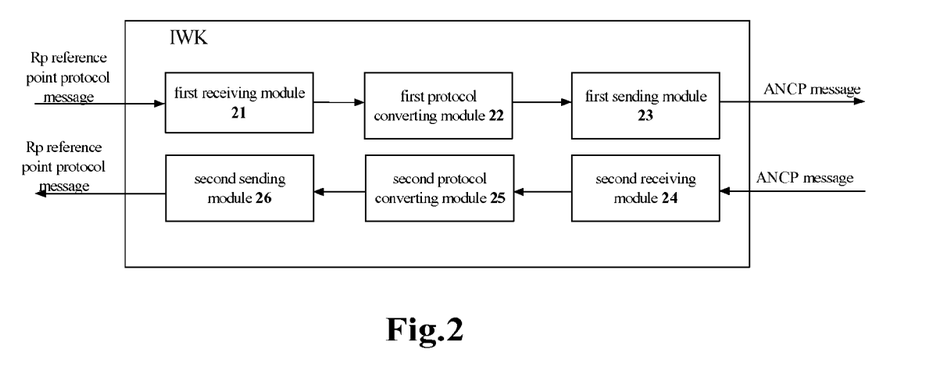
FIG. 2 is a structural schematic diagram of an interworking functional entity according to an embodiment of the present invention.

FIG. 2 is a structural schematic diagram of an interworking functional entity (IWK) according to an embodiment of the present invention. As shown in FIG. 2, the interworking functional entity includes: a first receiving module 21, a first protocol converting module 22, and a first sending module 23, wherein the first receiving module 21 is used for receiving an Rp reference point protocol message from a top-tier transport resource control functional entity; the first protocol converting module 22 is used for converting the Rp reference point protocol message into an ANCP message; and the first sending module 23 is used for sending the ANCP message obtained by conversion to a co-located transport resource control functional entity arranged in an access node.

In the embodiment, the interworking functional entity is configured to convert an Rp reference point protocol message into an access node control protocol message, such that the communication between the top-tier transport resource control functional entity and the co-located transport resource control functional entity arranged in the access node is realized, which solves the problem in the related art that the top-tier transport resource control functional entity cannot communicate with the co-located transport resource control functional entity arranged in the access node. By use of the embodiment, the communication from the top-tier transport resource control functional entity to the co-located transport resource control functional entity can be realized, and redeployment of the Rp reference point protocol at the access node is avoided, which not only reduces the expansion of the existing network, but also ensures the performance of the access node.

In the above, the first protocol converting module 22 converts the Rp reference point protocol message into the ANCP message according to a preset protocol mapping rule.

Preferably, as shown in FIG. 2, the above mentioned interworking functional entity further includes: a second receiving module 24, a second protocol converting module 25 and a second sending module 26, wherein the second receiving module 24 is used for receiving an ANCP message from the co-located transport resource control functional entity; the second protocol converting module 25 is used for converting the ANCP message into an Rp reference point protocol message; and the second sending module 26 is used for sending the Rp reference point protocol message obtained by conversion to the top-tier transport resource control functional entity.

In the embodiment, the interworking functional entity is configured to convert the access node control protocol message into the Rp reference point protocol message, such that the communication between the co-located transport resource control functional entity arranged in the access node and the top-tier transport resource control functional entity is realized, which solves the problem in the related art that the co-located transport resource control functional entity arranged in the access node cannot communicate with the top-tier transport resource control functional entity. By use of the embodiment, the communication from the co-located transport resource control functional entity to the top-tier transport resource control functional entity can be realized, and redeployment of the Rp reference point protocol at the access node is avoided, which not only reduces the expansion of the existing network, but also ensures the performance of the access node.

In the above, the second protocol converting module 25 converts the ANCP message into the Rp reference point protocol message according to a preset protocol mapping rule.

Further, the interworking functional entity is arranged within an IP edge node, and is located between the top-tier transport resource control functional entity and the co-located transport resource control functional entity; the interworking functional entity is connected to the top-tier transport resource control functional entity through an Rp reference point, and is connected to the co-located transport resource control functional entity through an ANCP protocol; the interworking functional entity is a termination point of the Rp reference point protocol with respect to the top-tier transport resource control functional entity; and the interworking functional entity is also used for acting as an agent between the IP edge node and the access node to surrogate the Rp reference point protocol message.

In the above embodiment, mutual conversion between the Rp reference point protocol message and the ANCP message is carried out by the interworking functional entity arranged within the IP edge node, such that the interaction between the top-tier transport resource control functional entity and the co-located transport resource control functional entity arranged in the access node is realized, which avoids the redeployment of the Rp reference point protocol at the access node, reduces the expansion of the existing network, and ensures the performance of the access node.

It is to be explained that, in the embodiments of the present invention, the Rp reference point protocol message may be specifically implemented by, but not limited to, the RCIP message.

The above interworking functional entity will be described in detail as follows by taking the Embodiment 1 as an example.

Embodiment 1

Figure 3:
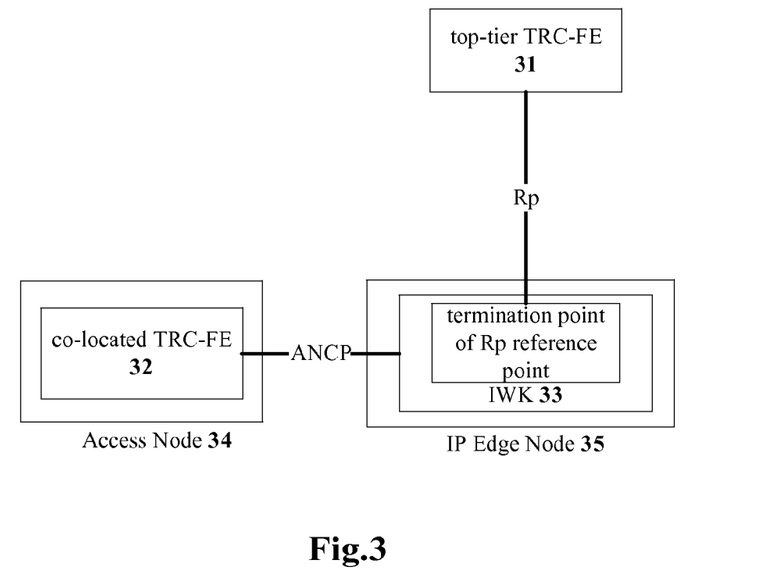
FIG. 3 is a schematic diagram of a preferred interworking system according to Embodiment 1 of the present invention.

FIG. 3 is a schematic diagram of a preferred interworking system according to the Embodiment 1 of the present invention. As shown in FIG. 3, in Embodiment 1, the top-tier transport resource control functional entity is Top-tier TRC-FE 31, the co-located transport resource control functional entity is Co-located TRC-FE 32 arranged in an access node 34, and an interworking functional entity (IWK) 33 is arranged in an IP Edge Node 35.

The Top-tier TRC-FE 31 interacts with the IWK 43 through an Rp reference point protocol (RCIP) message; the Co-located TRC-FE 32 interacts with the IWK 33 through an access node control protocol (ANCP) message; the IWK 33 carries out mutual conversion between the RCIP message and the ANCP message according to the preset protocol mapping rule, such that the interaction between the Top-tier TRC-FE and the Co-located TRC-FE is realized, and redeployment of the RCIP protocol at the access node is avoided.

According to an embodiment of the present invention, a protocol mapping method of an interworking functional entity is further provided.

As shown in FIG. 3, the interworking functional entity converts the Rp reference point protocol message received from the top-tier transport resource control functional entity into the ANCP message, and sends the ANCP message obtained by conversion to the co-located transport resource control functional entity arranged in the access node, wherein the interworking functional entity is arranged in the IP edge node.

During the specific implementation process, in the Rp reference point protocol message received by the interworking functional entity from the top-tier transport resource control functional entity, an identification of the Rp reference point protocol message is carried. An identification of the converted ANCP message is bound according to the identification of the received Rp reference point protocol message through the mapping relation between the Rp reference point protocol message and the ANCP message defined in the protocol mapping rule. The identification of the ANCP message is carried in the ANCP message obtained by the conversion, and is sent to the co-located transport resource control functional entity.

As shown in FIG. 3, the interworking functional entity converts the ANCP message received from the co-located transport resource control functional entity into an RCIP message, and sends the RCIP message obtained by conversion to the top-tier transport resource control functional entity.

During the specific implementation process, in the ANCP message received by the interworking functional entity from the co-located transport resource control functional entity, the identification of the ANCP message is carried. The identification of the converted Rp reference point protocol message is bound according to the identification of the received ANCP message through the mapping relation between the Rp reference point protocol message and the ANCP message defined in the protocol mapping rule. The identification of the Rp reference point protocol message is carried in the Rp reference point protocol message obtained by conversion, and is sent to the top-tier transport resource control functional entity.

With reference to the preferred interworking system in Embodiment 1, the top-tier transport resource control functional entity (Top-tier TRC-FE) is connected to the co-located transmission functional entity (Co-located TRC-FE) within the access node through the interworking functional entity (IWK) located in the IP edge node. There exist two cases as follows for the multicast admission control under the charge of the access node:

(1) access node multicast admission control (aggregate bandwidth adjustment) is initiated by the Top-tier TRC-FE; and (2) access node multicast admission control (aggregate bandwidth adjustment) is initiated by the Co-located TRC-FE.

The interworking method for multicast resource and admission control provided by the embodiments of the present invention will be described in detail with reference to the specific Embodiment 2 and Embodiment 3.

Embodiment 2

Figure 4:
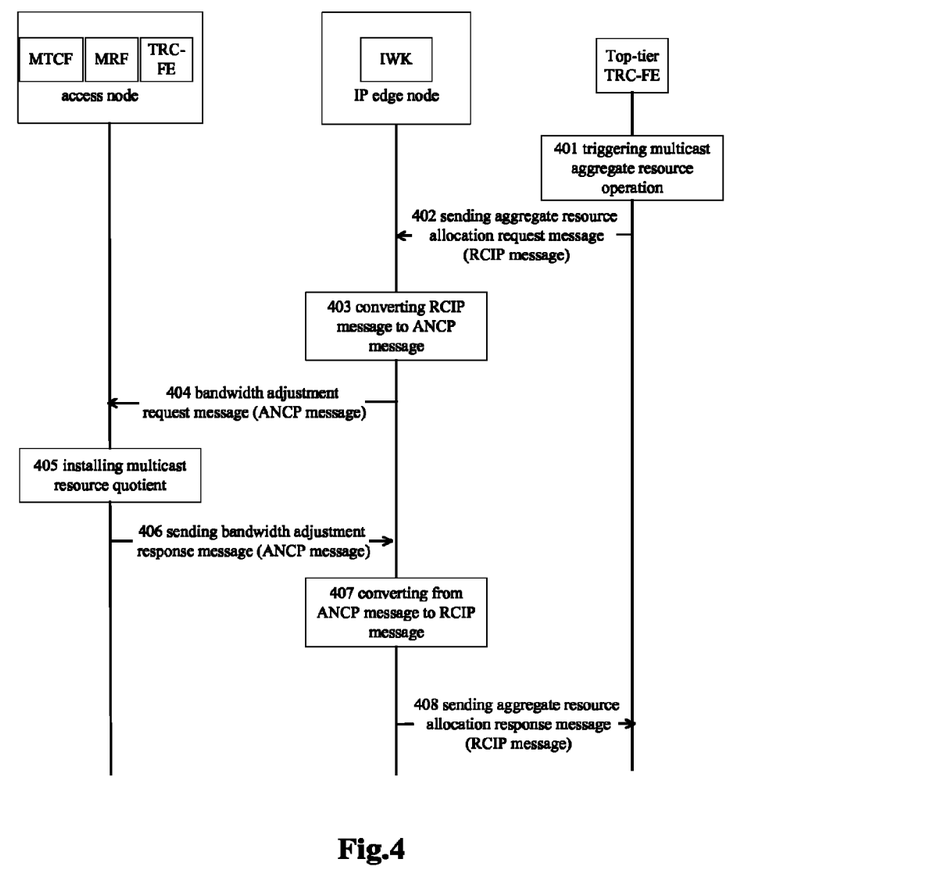
FIG. 4 is a flow chart of an interworking method of Top-tier TRC-FE initiating a request for multicast admission control according to Embodiment 2 of the present invention.

FIG. 4 is a flow chart of an interworking method of requesting multicast admission control initiated by the Top-tier TRC-FE according to Embodiment 2 of the present invention. As shown in FIG. 4, the specific process includes the steps (Step 401 to Step 408) as follows.

Step 401, the Top-tier TRC-FE initiates an operation of aggregate bandwidth adjustment which is designated by a specific multicast service.

Step 402, the Top-tier TRC-FE sends an aggregate resource allocation request message, which is set based on the RCIP protocol, to the IWK within the IP edge node.

Step 403, after receiving the aggregate resource allocation request message (RCIP message), the IWK terminates the RCIP message, initializes a bandwidth adjustment request message which is set based on the ANCP, and converts the above RCIP message (aggregate resource allocation request message) into the initialized ANCP message (bandwidth adjustment request message) according to the preset protocol mapping rule.

During the specific conversion process, the IWK maps a plurality of fields in the RCIP message to the ANCP message according to the pre-defined protocol mapping rule, for example, the IWK maps a bandwidth field in an aggregate resource object parameter in the RCIP message to a bandwidth-request TLV field of the ANCP message, such that the conversion from the RCIP message to the ANCP message is realized.

The pre-defined protocol mapping rule can also set a protocol mapping table, each item in the table at least including "Connection IP Object" of the RCIP message and "Transaction ID" of the ANCP message, so as to realize the positioning from the RCIP message to the ANCP message.

Step 404, the IWK sends the converted bandwidth adjustment request message (ANCP message) to the Co-located TRC-FE in the access node.

Step 405, the Co-located TRC-FE installs a pre-provisioned multicast resource budget according to the received ANCP message.

Step 406, the Co-located TRC-FE sends a bandwidth adjustment response message (ANCP message) carrying the installation result to the IWK.

Step 407, the IWK terminates the ANCP message after receiving the bandwidth adjustment response message (ANCP message), initializes an aggregate resource allocation response message (RCIP message), and converts the above ANCP message (bandwidth adjustment response message) into the initialized RCIP message (aggregate resource allocation response message) according to the preset protocol mapping rule.

During the specific conversion process, the IWK fulfills the positioning from the ANCP message to the RCIP message according to the protocol mapping table, and fulfills the mapping of a plurality of fields in the ANCP message to the fields in the RCIP message according to the preset protocol mapping rule, for example, the IWK maps a bandwidth-request TLV field of the ANCP message to a bandwidth field in an aggregate resource object parameter of the RCIP message.

Step 408, the IWK sends the aggregate resource allocation response message (RCIP message) carrying the installation result to the Top-tier TRC-FE.

Embodiment 3

Figure 5:
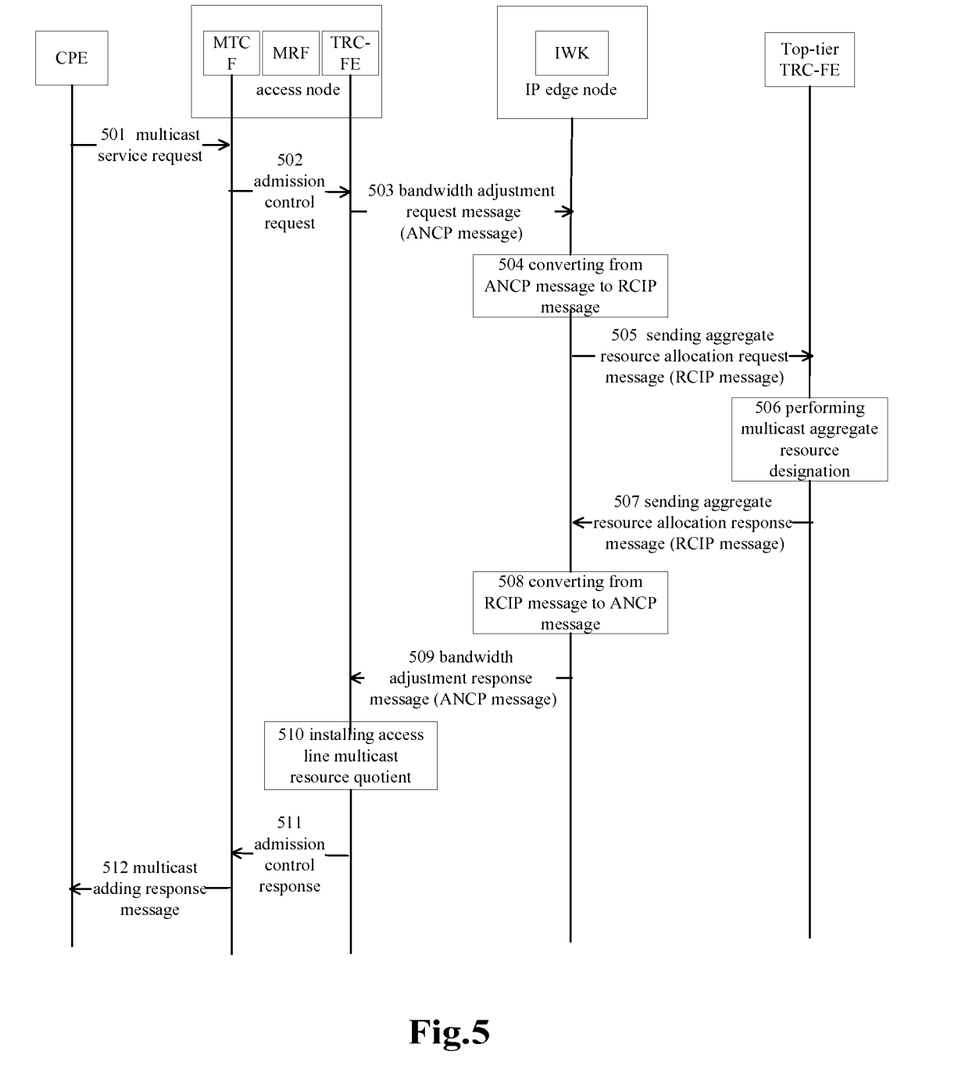
FIG. 5 is a flow chart of an interworking method of Co-located TRC-FE initiating multicast admission control according to Embodiment 3 of the present invention.

FIG. 5 is a flow chart of an interworking method of multicast admission control initiated by the Co-located TRC-FE according to Embodiment 3 of the present invention. As illustrated in FIG. 5, the specific process includes steps (Step 501 to Step 512) as follows.

Step 501, a user equipment sends a multicast service request to the access node.

Step 502, a multicast transport control functional entity (MTCF) in the access node processes the received multicast service request, if the channel requested by the user is not yet available at the access node, the MTCF requests the Co-located TRC-FE to perform the resource and admission control of the channel.

Step 503, the Co-located TRC-FE performs the resource and admission control of the above channel, if a bandwidth adjustment is needed, the Co-located TRC-FE sends a bandwidth adjustment request message (ANCP message) to the IWK.

Step 504, after receiving the bandwidth adjustment request message (ANCP message), the IWK terminates the ANCP message, initializes an aggregate resource allocation request message (RCIP message), and converts the ANCP message (bandwidth adjustment request message) into the initialized RCIP message (aggregate resource allocation request message) according to the preset protocol mapping rule.

During the specific conversion process, the IWK fulfills the positioning from the ANCP message to the RCIP message according to the protocol mapping table, fulfills the mapping of a plurality of fields in the ANCP message to the fields in the RCIP message according to the preset protocol mapping rule, for example, the IWK maps a bandwidth-request TLV field of the ANCP message into a bandwidth field in an aggregate resource object parameter of the RCIP message.

Step 505, the IWK sends the aggregate resource allocation request message (RCIP message) to the Top-tier TRC-FE.

Step 506, the Top-tier TRC-FE performs a multicast aggregate resource designation after receiving the aggregate resource allocation request message.

Step 507, the Top-tier TRC-FE sends an aggregate resource allocation response message (RCIP message) carrying the designation result to the IWK.

Step 508, after receiving the aggregate resource allocation response message (RCIP message), the IWK terminates the RCIP message, initializes a bandwidth adjustment response message (ANCP message), and converts the above RCIP message (aggregate resource allocation response message) into the initialized ANCP message (bandwidth adjustment response message) according to the preset protocol mapping rule.

During the specific conversion process, the IWK fulfills the positioning from the RCIP message to the ANCP message according to the protocol mapping table, fulfills the mapping of a plurality of fields in the RCIP message to the fields in the ANCP message according to the preset protocol mapping rule, for example, the IWK maps the bandwidth field in the aggregate resource object parameter of the RCIP message into the bandwidth-request TLV field of the ANCP message.

Step 509, the IWK sends the converted bandwidth adjustment response message (ANCP message) to the Co-located TRC-FE at the access node.

Step 510, the Co-located TRC-FE installs a pre-provisioned multicast resource budget according to the designation result in the received ANCP message.

Step 511, the Co-located TRC-FE sends a resource and admission control response message to the MTCF.

Step 512, the MTCF sends a multicast service response message to the user equipment.

As mentioned above, by means of the technical solution provided in the embodiments of the present invention, the interworking functional entity performs mutual conversion between the Rp reference point protocol message and the access node control protocol (ANCP) message according to the preset protocol mapping rule, so as to realize the interaction between the top-tier transport resource control functional entity and the co-located transport resource control functional entity arranged in the access node, which avoids the redeployment of the RCIP protocol at the access node, reduces the expansion of the existing network, and ensures the performance of the access node.

The descriptions above are only preferable embodiments of the present invention, which are not used to restrict the present invention. For those skilled in the art, the present invention may have various changes and variations. Any modifications, equivalent substitutions, improvements etc. within the spirit and principle of the present invention are all included in the scope of the present invention.

What is claimed is:

1. An interworking functional entity, comprising:
a first receiving module, configured to receive a first Rp reference point protocol message from a top-tier transport resource control functional entity;
a first protocol converting module, configured to convert the first Rp reference point protocol message into a first access node control protocol (ANCP) message, wherein the first protocol converting module is configured to convert the first Rp reference point protocol message into the first ANCP message by mapping a bandwidth field in an aggregate resource object parameter in the first Rp reference point protocol message to a bandwidth-request TLV field of the first ANCP message; and
a first sending module, configured to send the first ANCP message obtained by conversion to a co-located transport resource control functional entity arranged in an access node.

2. The interworking functional entity according to claim 1, wherein,
the first protocol converting module converts the first Rp reference point protocol message into the first ANCP message according to a preset protocol mapping rule.

3. The interworking functional entity according to claim 2, wherein the interworking functional entity is arranged within an IP edge node, and is located between the top-tier transport resource control functional entity and the co-located transport resource control functional entity; the interworking functional entity is connected to the top-tier transport resource control functional entity through an Rp reference point, and is connected to the co-located transport resource control functional entity through an ANCP protocol; the interworking functional entity is a termination point of the Rp reference point protocol with respect to the top-tier transport resource control functional entity; and the interworking functional entity is also configured to act as an agent between the IP edge node and the access node to surrogate the first Rp reference point protocol message.

4. The interworking functional entity according to claim 1, further comprising:
a second receiving module, configured to receive a second ANCP message from the co-located transport resource control functional entity;
a second protocol converting module, configured to convert the second ANCP message into a second Rp reference point protocol message; and
a second sending module, configured to send the second Rp reference point protocol message obtained by conversion to the top-tier transport resource control functional entity.

5. The interworking functional entity according to claim 4, wherein,
the second protocol converting module converts the second ANCP message into the second Rp reference point protocol message according to a preset protocol mapping rule.

6. The interworking functional entity according to claim 5, wherein the interworking functional entity is arranged within an IP edge node, and is located between the top-tier transport resource control functional entity and the co-located transport resource control functional entity; the interworking functional entity is connected to the top-tier transport resource control functional entity through an Rp reference point, and is connected to the co-located transport resource control functional entity through an ANCP protocol; the interworking functional entity is a termination point of the Rp reference point protocol with respect to the top-tier transport resource control functional entity; and the interworking functional entity is also configured to act as an agent between the IP edge node and the access node to surrogate the first Rp reference point protocol message and/or the second Rp reference point protocol message.

7. The interworking functional entity according to claim 4, wherein the interworking functional entity is arranged within an IP edge node, and is located between the top-tier transport resource control functional entity and the co-located transport resource control functional entity; the interworking functional entity is connected to the top-tier transport resource control functional entity through an Rp reference point, and is connected to the co-located transport resource control functional entity through an ANCP protocol; the interworking functional entity is a termination point of the Rp reference point protocol with respect to the top-tier transport resource control functional entity; and the interworking functional entity is also configured to act as an agent between the IP edge node and the access node to surrogate the first Rp reference point protocol message and/or the second Rp reference point protocol message.

8. The interworking functional entity according to claim 1, wherein the interworking functional entity is arranged within an IP edge node, and is located between the top-tier transport resource control functional entity and the co-located transport resource control functional entity; the interworking functional entity is connected to the top-tier transport resource control functional entity through an Rp reference point, and is connected to the co-located transport resource control functional entity through an ANCP protocol; the interworking functional entity is a termination point of the Rp reference point protocol with respect to the top-tier transport resource control functional entity; and the interworking functional entity is also configured to act as an agent between the IP edge node and the access node to surrogate the first Rp reference point protocol message.

9. A protocol mapping method of an interworking functional entity, comprising:

an interworking functional entity converting a first Rp reference point protocol message received from a top-tier transport resource control functional entity into a first ANCP message, and sending the first ANCP message obtained by conversion to a co-located transport resource control functional entity arranged within an access node, wherein the interworking functional entity converting the first Rp reference point protocol message into the first ANCP message comprises: the interworking functional entity mapping a bandwidth field in an aggregate resource object parameter in the first Rp reference point protocol message to a bandwidth-request TLV field of the first ANCP message; and/or the interworking functional entity converting a second ANCP message received from the co-located transport resource control functional entity into a second Rp reference point protocol message, and sending the second Rp reference point protocol message obtained by conversion to the top-tier transport resource control functional entity, wherein the interworking functional entity converting the second ANCP message into the second Rp reference point protocol message comprises: the interworking functional entity mapping a bandwidth-request TLV field of the second ANCP message to a bandwidth field in an aggregate resource object parameter of the second Rp reference point protocol message.

10. The method according to claim 9, wherein,
the first Rp reference point protocol message carries an identification of the first Rp reference point protocol message, and the first ANCP message carries an identification of the first ANCP message; and/or
the second Rp reference point protocol message carries an identification of the second Rp reference point protocol message, and the second ANCP message carries an identification of the second ANCP message.

11. The method according to claim 10, further comprising:
presetting a protocol mapping rule, wherein the protocol mapping rule comprises: a mapping relation between the identification of the first Rp reference point protocol message and the identification of the first ANCP message; and/or a mapping relation between the identification of the second Rp reference point protocol message and the identification of the second ANCP message.

12. The method according to claim 11, wherein the manner of the interworking functional entity converting the first Rp reference point protocol message into the first ANCP message comprises:
the interworking functional entity mapping a field in the first Rp reference point protocol message to a corresponding field in the first ANCP message according to the preset protocol mapping rule; and the interworking functional entity mapping the identification of the first Rp reference point protocol message according to the mapping relation in the preset protocol mapping rule to obtain the identification of the first ANCP message.

13. The method according to claim 11, wherein the manner of the interworking functional entity converting the second ANCP message into the second Rp reference point protocol message comprises:
the interworking functional entity mapping a field in the second ANCP message to a corresponding field in the second Rp reference point protocol message according to the preset protocol mapping rule; and
the interworking functional entity mapping the identification of the second ANCP message according to the preset protocol mapping rule to obtain the identification of the second Rp reference point protocol message.

14. The method according to claim 9, further comprising:
presetting a protocol mapping rule, wherein the protocol mapping rule comprises: a mapping relation between an identification of the first Rp reference point protocol message and an identification of the first ANCP message; and/or a mapping relation between an identification of the second Rp reference point protocol message and an identification of the second ANCP message.

15. The method according to claim 14, wherein the manner of the interworking functional entity converting the first Rp reference point protocol message into the first ANCP message comprises:
the interworking functional entity mapping a field in the first Rp reference point protocol message to a corresponding field in the first ANCP message according to the preset protocol mapping rule; and
the interworking functional entity mapping the identification of the first Rp reference point protocol message according to the mapping relation in the preset protocol mapping rule to obtain the identification of the first ANCP message.

16. The method according to claim 14, wherein the manner of the interworking functional entity converting the second ANCP message into the second Rp reference point protocol message comprises:
the interworking functional entity mapping a field in the second ANCP message to a corresponding field in the second Rp reference point protocol message according to the preset protocol mapping rule; and
the interworking functional entity mapping the identification of the second ANCP message according to the preset protocol mapping rule to obtain the identification of the second Rp reference point protocol message.

* * * * *